United States Patent
Yumura et al.

(10) Patent No.: US 9,252,597 B2
(45) Date of Patent: Feb. 2, 2016

(54) ELECTRIC POWER MANAGEMENT APPARATUS, SYSTEM AND METHOD

(75) Inventors: Tsubasa Yumura, Ome (JP); Yoshiki Terashima, Kawasaki (JP)

(73) Assignee: Kabushiki Kaisha Toshiba, Minato-ku, Tokyo (JP)

(*) Notice: Subject to any disclaimer, the term of this patent is extended or adjusted under 35 U.S.C. 154(b) by 426 days.

(21) Appl. No.: 13/241,556

(22) Filed: Sep. 23, 2011

(65) Prior Publication Data

US 2012/0242293 A1    Sep. 27, 2012

(30) Foreign Application Priority Data

Mar. 25, 2011 (JP) ................ 2011-068911

(51) Int. Cl.
*H02J 3/32* (2006.01)
*H02J 3/14* (2006.01)

(52) U.S. Cl.
CPC ............. *H02J 3/32* (2013.01); *H02J 2003/143* (2013.01); *Y02B 70/3266* (2013.01); *Y04S 20/242* (2013.01)

(58) Field of Classification Search
CPC ....................................................... Y02E 60/12
USPC .......................................................... 320/134
See application file for complete search history.

(56) References Cited

U.S. PATENT DOCUMENTS

| | | | |
|---|---|---|---|
| 7,783,389 B2* | 8/2010 | Yamada et al. ............... | 700/286 |
| 2007/0276547 A1* | 11/2007 | Miller .......................... | 700/295 |
| 2008/0167756 A1* | 7/2008 | Golden et al. ................ | 700/297 |
| 2009/0094173 A1* | 4/2009 | Smith et al. .................. | 705/412 |
| 2010/0017045 A1* | 1/2010 | Nesler et al. ................. | 700/296 |
| 2010/0070099 A1* | 3/2010 | Watson et al. ................ | 700/295 |
| 2010/0262312 A1* | 10/2010 | Kubota et al. ............... | 700/295 |
| 2011/0015797 A1* | 1/2011 | Gilstrap ....................... | 700/291 |

FOREIGN PATENT DOCUMENTS

| | | |
|---|---|---|
| CN | 1704868 A | 12/2005 |
| JP | 11-41831 | 2/1999 |
| JP | 2002-10532 A | 1/2002 |
| JP | 2002-142378 A | 5/2002 |
| JP | 2002-176729 A | 6/2002 |

(Continued)

OTHER PUBLICATIONS

Japanese Office Action dated Jan. 15, 2013 (with English translation) from corresponding Japanese Application No. 2011-068911, 10 pages.

(Continued)

*Primary Examiner* — Drew A Dunn
*Assistant Examiner* — Jerry D Robbins
(74) *Attorney, Agent, or Firm* — Ohlandt, Greeley, Ruggiero & Perle, L.L.P.

(57) ABSTRACT

According to one embodiment, an electric power management apparatus is for controlling electric power of at least one home appliance using at least one rechargeable battery. The apparatus includes an analysis unit, a first generating unit, and a second generating unit. The analysis unit analyzes a charge residue of the rechargeable battery. The first generating unit generates a control schedule used to control the electric power of the home appliance in accordance with the charge residue. The second generating unit generates a charge/discharge schedule used to control charge and discharge of the rechargeable battery in accordance with the charge residue.

11 Claims, 6 Drawing Sheets

(56) References Cited

FOREIGN PATENT DOCUMENTS

| | | |
|---|---|---|
| JP | 2004-180404 A | 6/2004 |
| JP | 3730614 A | 10/2005 |
| JP | 2007-129873 A | 5/2007 |
| JP | 2007-295680 A | 11/2007 |
| JP | 2007-330057 A | 12/2007 |
| JP | 2008-67418 A | 3/2008 |
| JP | 2008-128604 A | 6/2008 |
| JP | 2008-306832 A | 12/2008 |
| JP | 2009-284586 A | 12/2009 |
| JP | 2010-193562 A | 9/2010 |
| JP | 2010-259163 A | 11/2010 |

OTHER PUBLICATIONS

First Chinese Office Action dated Nov. 28, 2013 (with English translation) from corresponding Chinese Patent Application No. 201110277759.0, 10 pages.

* cited by examiner

| Charging start time | Charging end time |
|---|---|
| 13:30 | 14:00 |

| Event ID | Appliance ID | Appliance type | Event type | Event set value | Event time |
|---|---|---|---|---|---|
| 1 | AAAA | Illumination | power | OFF | 14:00 |
| 2 | BBBB | Air conditioner | set_temp_cooler | 28 | 14:15 |
| 3 | BBBB | Air conditioner | set_temp_cooler | 26 | 15:00 |
| 4 | AAAA | Illumination | power | ON | 15:00 |

ELECTRIC POWER MANAGEMENT APPARATUS, SYSTEM AND METHOD

CROSS-REFERENCE TO RELATED APPLICATIONS

This application is based upon and claims the benefit of priority from the prior Japanese Patent Application No. 2011-068911, filed Mar. 25, 2011, the entire contents of which are incorporated herein by reference.

FIELD

Embodiments described herein relate generally to an electric power management apparatus, system and method.

BACKGROUND

An electric power management system (for realizing Demand Response (DR)) is known in which a demand (request) for power saving is issued from an electric power company to an electric power management server (=an electric power management apparatus) in order to balance supply and demand of electric power. The electric power management server controls the equipment to manage in order to respond to the power saving demand. Rechargeable batteries are included in the equipment to manage. There is a case where the electricity accumulated in a rechargeable battery is used to meet the demand.

Rechargeable batteries may not be fully charged to prevent aging degradation. This makes it difficult to sufficiently exhibit the performance of the batteries when responding to the power saving demand.

DETAILED DESCRIPTION

In general, according to one embodiment, an electric power management apparatus is for controlling electric power of at least one home appliance using at least one rechargeable battery. The apparatus includes an analysis unit, a first generating unit, and a second generating unit. The analysis unit analyzes a charge residue of the rechargeable battery. The first generating unit generates a control schedule used to control the electric power of the home appliance in accordance with the charge residue. The second generating unit generates a charge/discharge schedule used to control charge and discharge of the rechargeable battery in accordance with the charge residue.

Referring to the accompanying drawings, an electric power management apparatus, system and method according to an embodiment and a modification of the embodiment will be described in detail. In the embodiment and modification, like reference numbers denote like elements, and duplicate explanation will be avoided.

The electric power management apparatus, system and method of the embodiment can realize best use of a rechargeable battery when responding to a power saving demand.

Figure 1:
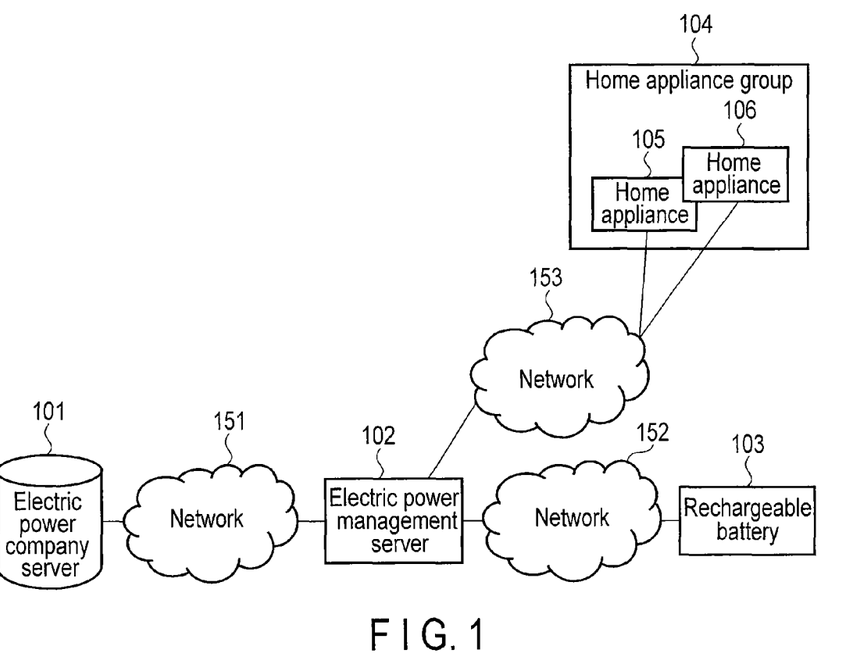
FIG. 1 is a block diagram illustrating a system according to an embodiment.

Referring first to FIG. 1, the system of the embodiment will be described.

As shown, the system comprises an electric power company server 101, an electric power management server 102, a rechargeable battery 103, a home appliance group 104, and networks 151, 152 and 153 connecting them. The electric power management server 102 is also referred to as an electric power management apparatus 102.

The electric power company server 101 has a function of transmitting a power saving demand packet to the electric power management server 102 via the network 151.

The electric power management server 102 manages the electric power of the home appliance group 104 and the rechargeable battery 103 connected thereto, in response to a power saving demand received from the electric power company server 101 via the network 151. The electric power management server 102 has a function of receiving a power saving demand packet, a function of transmitting a rechargeable-battery-state confirming demand packet, a function of receiving a rechargeable-battery-state acknowledgement packet, a function of generating a control schedule table, and a function of transmitting an event command. The electric power company server 101 and the electric power management server 102 are connected to each other via the network 151.

The rechargeable battery 103 can supply electric power to the appliances connected thereto. In the embodiment, the rechargeable battery 103 can supply electric power to the home appliances 105 and 106 included in the home appliance group 104, and to the electric power management server 102. In the embodiment, the rechargeable battery 103 includes a communication unit for exchanging information with the electric power management server 102. The rechargeable battery 103 and the electric power management server 102 are connected to each other via the network 152.

The home appliance group 104 includes a plurality of home appliances 105 and 106, etc., which are powered by electric power. The electric power management server 102 is connected to the home appliances 105 and 106 via the network 153. The home appliances 105 and 106 include respective communication units for exchanging information with the electric power management server 102 via the network 153.

The networks 151, 152 and 153 are formed of an internet line, such as ADSL or FTTH, a broadband mobile line, the Ethernet (trademark), a wireless LAN, Bluetooth (trademark), IEEE802.15.4., etc., or of a combination thereof.

The electric power management server 102, the rechargeable battery 103 and the home appliance group 104 are generally powered by the same power supply, although not shown. Alternatively, the electric power management server 102 may be powered by a power supply different from that of the rechargeable battery 103 and the home appliance group 104.

Figure 2:
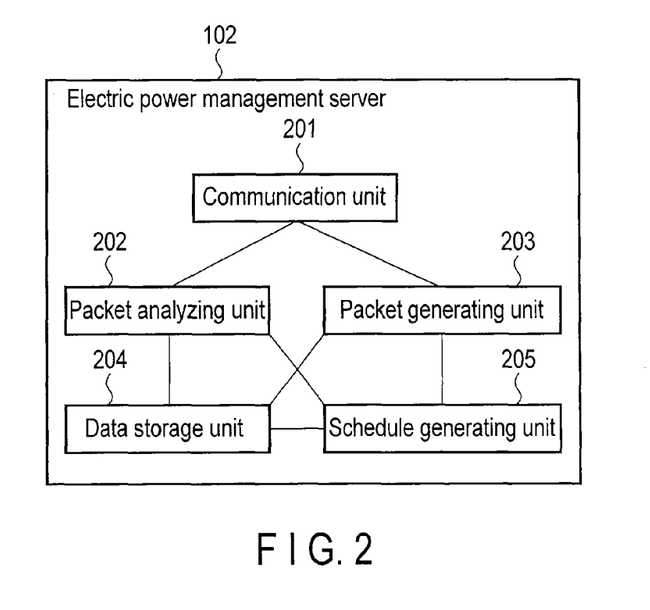
FIG. 2 is a block diagram illustrating the electric power management server shown in FIG. 1.
Figure 3:
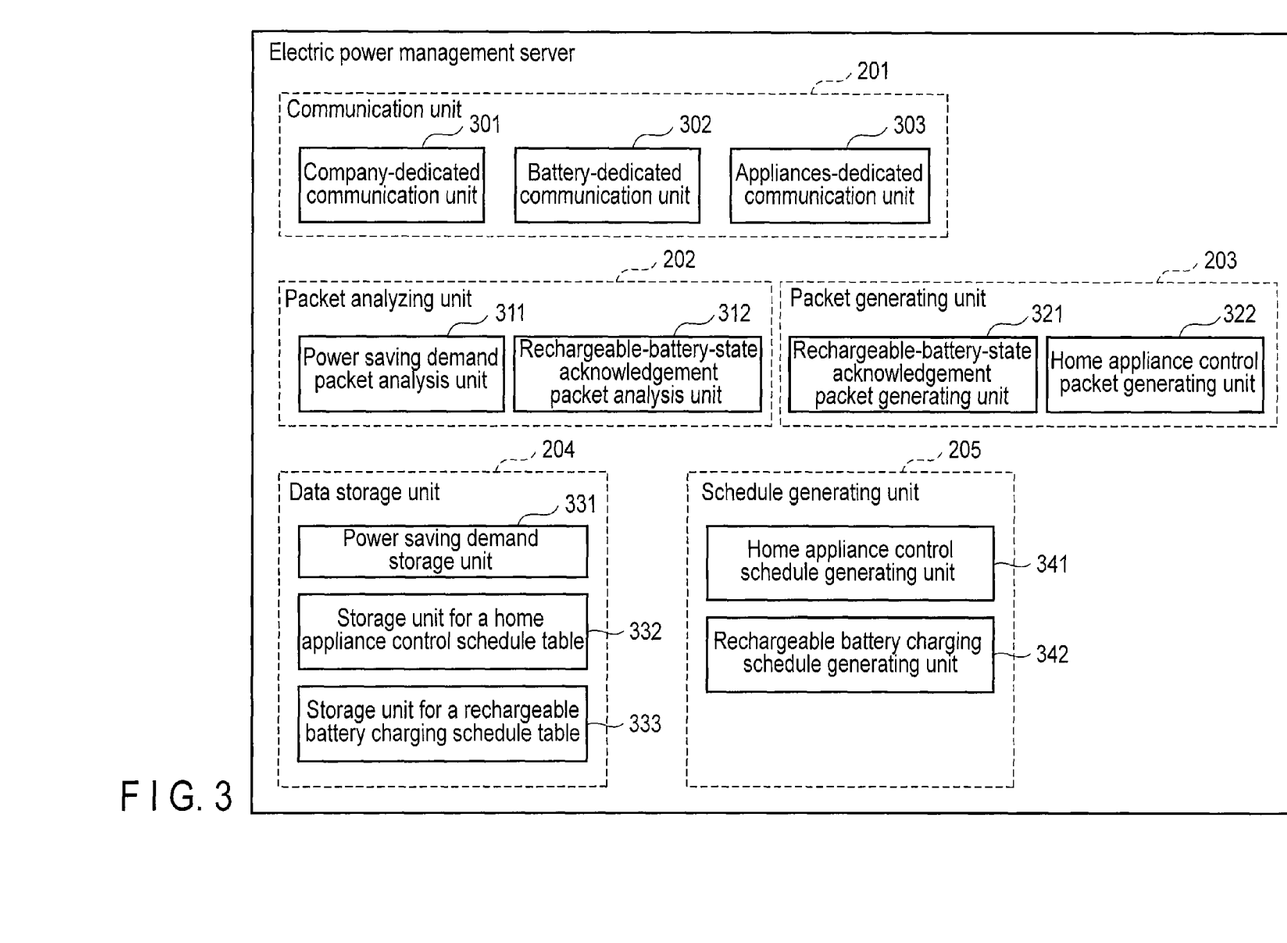
FIG. 3 is a block diagram illustrating the electric power management server of FIG. 2 in detail.

Referring now to FIGS. 2 and 3, the electric power management server 102 will be described. FIG. 3 is a view illustrating the electric power management server 102 in detail.

The electric power management server 102 comprises a communication unit 201, a packet analyzing unit 202, a packet generating unit 203, a data storage unit 204 and a schedule generating unit 205.

The communication unit 201 communicates with the electric power company server 101, the rechargeable battery 103 and the home appliance group 104 via the networks 151, 152 and 153. The communication unit 201 comprises a company-dedicated communication unit 301 for communicating with the electric power company server 101, a battery-dedicated communication unit 302 for communicating with the rechargeable battery 103, and an appliances-dedicated communication unit 303 for communicating with the home appliances.

The packet analyzing unit 202 analyzes each packet to extract information therefrom. The packet analysis unit 202 comprises a power saving demand packet analysis unit 311, and a rechargeable-battery-state acknowledgement packet analysis unit 312.

The packet generating unit 203 generates packets to be transmitted to the rechargeable battery 103 and the home appliance group 104. The packet generating unit 203 comprises a rechargeable-battery-state acknowledgement packet generating unit 321 and a home appliance control packet generating unit 322.

The data storage unit 204 stores information included in packets, and generated schedules. The data storage unit 204 comprises a power saving demand storage unit 331, a storage unit 332 for a home appliance control schedule table, and a storage unit 333 for a rechargeable battery charging schedule table.

The schedule generating unit 205 generates a schedule associated with the charge of the rechargeable battery 103, and a schedule associated with control of the electric power levels of the home appliances 105 and 106 of the home appliance group 104. The schedule generating unit 205 comprises a home appliance control schedule generating unit 341 and a rechargeable battery charging schedule generating unit 342.

The company-dedicated communication unit 301, the battery-dedicated communication unit 302 and the appliances-dedicated communication unit 303 exchange information with the electric power company server 101, the rechargeable battery 103 and the home appliance group 104, respectively.

The power saving demand packet analysis unit 311 receives a power saving demand packet from the electric power company server 101, and analyzes the content of the packet to extract information therefrom. The rechargeable-battery-state acknowledgement packet analysis unit 312 receives a rechargeable-battery-state acknowledgement packet from the rechargeable battery 103, and analyzes the content of the packet to extract information therefrom.

The rechargeable-battery-state acknowledgement packet generating unit 321 generates a demand packet for confirming the state of the rechargeable battery 103. The home appliance control packet generating unit 322 generates packets for controlling the electric power levels of the home appliances.

The power saving demand storage unit 331 stores the information included in the power saving demand packet from the electric power company server 101. The home appliance control schedule table storage unit 332 stores the home appliance control schedule table generated based on at least one home appliance control event described later. The rechargeable battery charging schedule table storage unit 333 stores data indicating the residual charge of the rechargeable battery 103 assumed at the start of power saving, and stores a charge schedule for the rechargeable battery 103.

The home appliance control schedule generating unit 341 generates a home appliance control schedule table. The rechargeable battery charging schedule generating unit 342 generates a rechargeable battery charging schedule, and performs determination and control associated with rechargeable battery charging/discharging.

Figure 4:
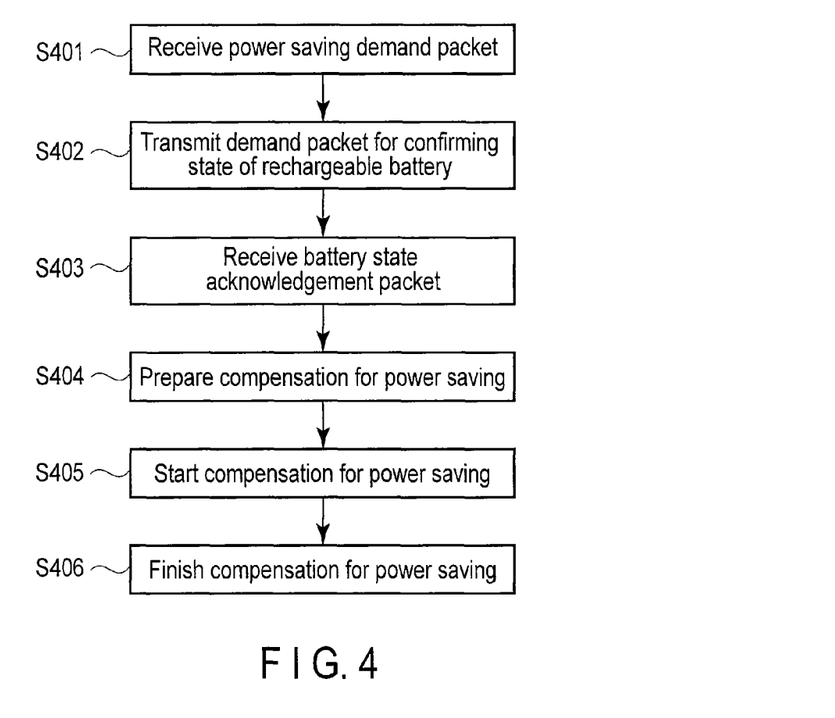
FIG. 4 is a flowchart illustrating an example of the electric power management server shown in FIG. 1.

Referring then to FIG. 4, an operation example of the electric power management server 102 will be described.

Figure 5:
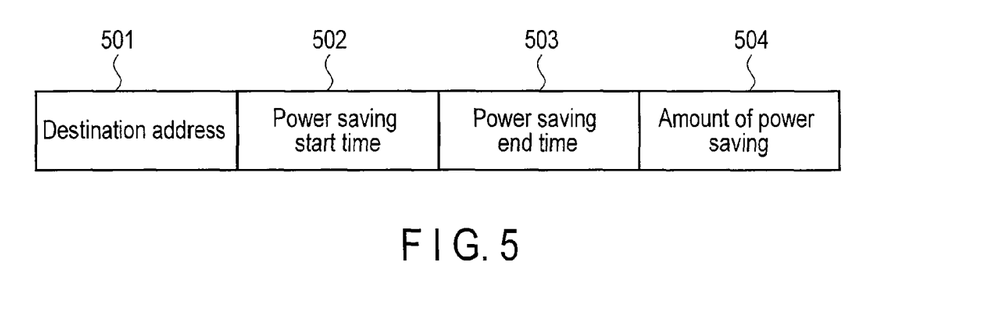
FIG. 5 is a view illustrating the content of a power saving demand packet sent from the power company server of FIG. 1 to the power management server of FIG. 1.

At the start of a power saving demand by the electric power company server 101, the company-dedicated communication unit 301 receives a power saving demand packet from the electric power company server 101 (step S401). As shown in FIG. 5, the power saving demand packet contains, for example, a destination address 501, power saving start time data 502, power saving end time data 503, and power saving amount data 504. The destination address 501 is formed of the address of the electric power management server 102 that demands power saving.

The power saving demand packet analysis unit 311 analyzes the packet, and stores, in the power saving demand storage unit 331, the power saving start time data 502, the power saving end time data 503, and the power saving amount data 504.

The rechargeable-battery-state acknowledgement packet generating unit 321 generates a demand packet for confirming the state of the rechargeable battery 103, and the battery-dedicated communication unit 302 transmits the demand packet to the rechargeable battery 103 (step S402).

Upon receiving the demand packet, the rechargeable battery 103 transmits a battery state acknowledgement packet to the electric power management server 102. The battery state acknowledgement packet contains data indicating a residue charge (SoC) and a battery life (SoH).

The battery-dedicated communication unit 302 receives the battery state acknowledgement packet (step S403). The rechargeable-battery-state acknowledgement packet analysis unit 312 analyzes the acknowledgement packet to acquire therefrom information indicating the residue charge and battery life of the rechargeable battery 103, thereby storing it in, for example, the power saving demand storage unit 331.

The electric power management server and the rechargeable battery perform preparation for power saving (step S404).

Figure 6:
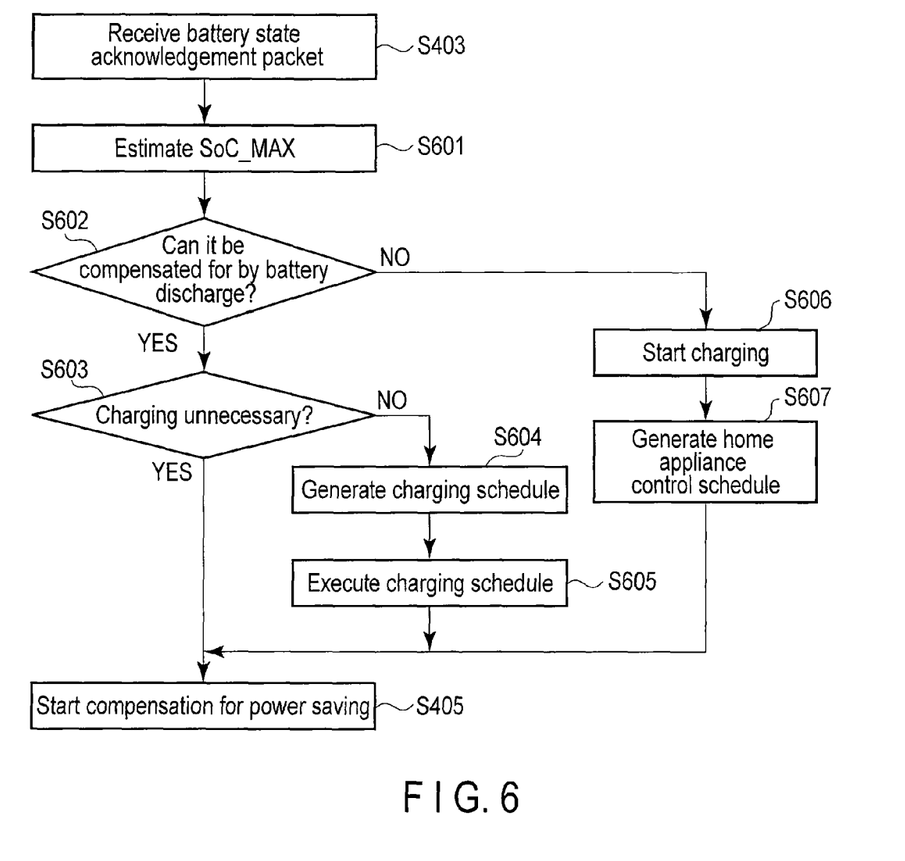
FIG. 6 is a flowchart illustrating in detail step S404 of FIG. 4.

Referring to FIG. 6, the detailed content of step S404 will be described.

The rechargeable battery charging schedule generating unit 342 estimates a maximum electric energy SoC_MAX based on SoC and SoH, and stores the estimated value in the rechargeable battery charging schedule table storage unit 333 (step S601). The maximum electric energy SoC_MAX is the residue charge estimated at a power saving start time supposing that the rechargeable battery is charged at the maximum capacity during the time ranging from the time of the estimation to the power saving start time.

The rechargeable battery charging schedule generating unit 342 determines whether to-be-saved power can be compensated for only by the discharge of the battery (step S602).

In this determination, SoC_MAX is compared with data contained in the power saving demand packet and indicating to-be-saved electric power P.

If SoC_MAX is greater than the to-be-save electric power P (Yes at step S602), the rechargeable battery charging schedule generating unit 342 determines whether it is necessary to charge the rechargeable battery, setting, as a current residual charge SoC_Now, the residual charge SoC read from the rechargeable battery state acknowledgment packet (step S603). More specifically, the rechargeable battery charging schedule generating unit 342 compares the current residual charge SoC_Now with the to-be-saved electric power P, thereby determining whether it is necessary or not to charge the rechargeable battery.

If SoC_Now is greater than P (Yes at step S603), no charging operation is necessary and compensation for to-be-saved power is started (step S405).

Figure 7:
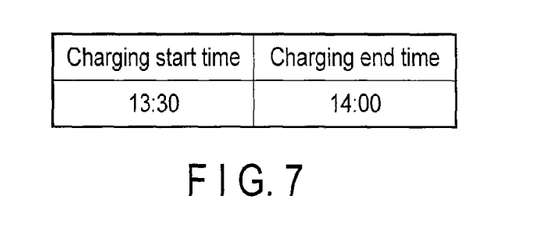
FIG. 7 is a view illustrating information contained in a rechargeable battery charging schedule.

In contrast, if SoC_Now is not greater than P (No at step S603), the rechargeable battery charging schedule generating unit 342 generates a rechargeable battery charging schedule (step S604). As shown in FIG. 7, the rechargeable battery charging schedule contains data indicating the charging start time and the charging end time. The charging start and end times are earlier than the power saving start time.

Figure 8:
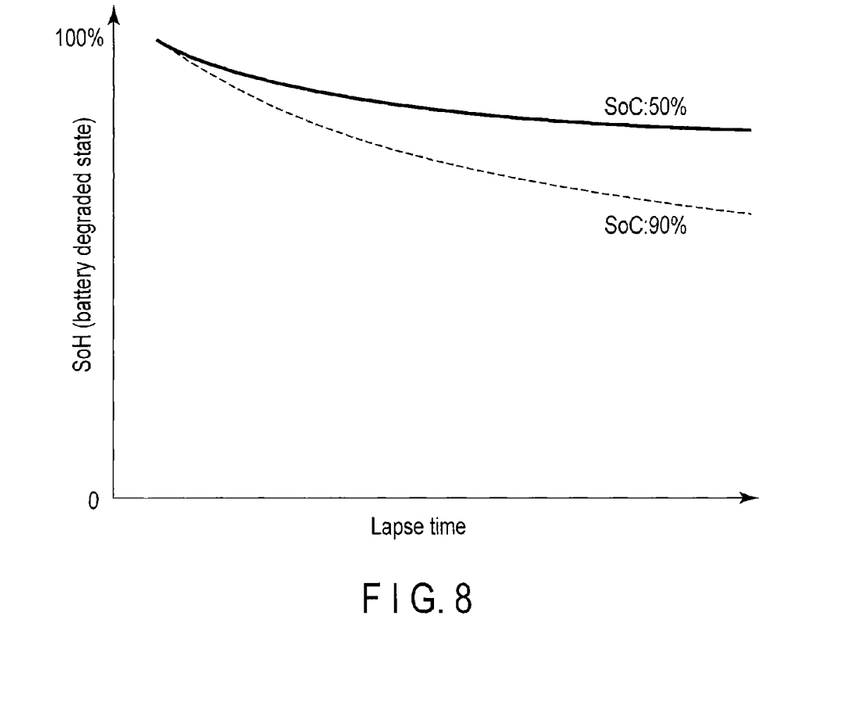
FIG. 8 is a graph indicating the relationship between the degree of degradation and the residual charge of the rechargeable battery of FIG. 1.

The rechargeable battery charging schedule is determined on condition that a residual charge SoC_Start assumed at the power saving start time is greater than the to-be-saved electric power P. If the rechargeable battery charging schedule is not uniquely determined, a schedule in which the charging time is shortest is selected. If it is not uniquely determined even by this schedule, the relationship, shown in FIG. 8, between the residual charge and the degradation level of the rechargeable battery is utilized to keep the state in which the degradation of the battery is smallest, thereby most suppressing the degradation of the battery. In FIG. 8, "50%" and "90%" indicate variations in SoH occurring with time when battery residues of 50% and 90% are maintained, respectively.

When the execution time of the charging schedule is reached, the battery executes the charging schedule stored in the rechargeable battery charging schedule table storage unit 333 (step S605). When the charting end time is reached, charging of the rechargeable battery is ended.

Figure 9:
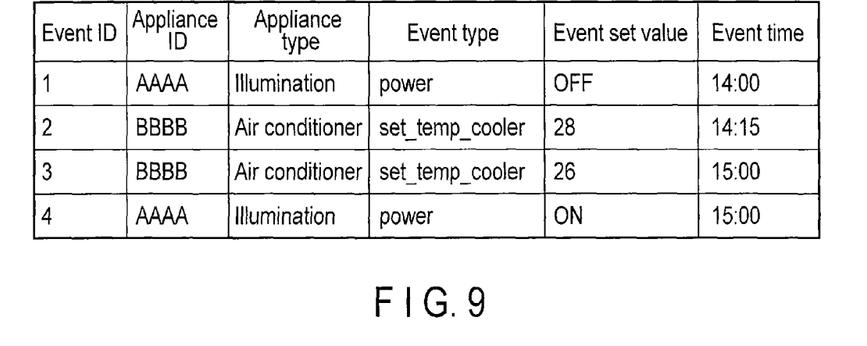
FIG. 9 is a view illustrating the content of a home appliance control table generated by the electric power management server of FIG. 1.

If the to-be-saved electric power P is not less than SoC_MAX at step S602 (No at step S602), charging is started at once (step S606). The home appliance control schedule generating unit 341 generates a home appliance control schedule (step S607). The home appliance control schedule comprises one or more home appliance control events. Each home appliance control event contains, for example, "event ID," "appliance ID," "appliance type" data, "event type" data, "event set value," "event time point." The home appliance control schedule generating unit 341 generates such a home appliance control table as shown in FIG. 9, in which all home appliance control events are arranged, and stores the table in the home appliance control schedule table storage unit 332.

The event ID is a docked number in the home appliance control table. The appliance ID is a unique number assigned to a home appliance to identify it. The appliance type indicates the type of an appliance, such as "air conditioner" or "illumination." The event type indicates the type of an operation of commanding a home appliance for appliance control. The event type indicates, for example, ON/OFF of a home appliance, indicates, in the case of an air conditioner, the set temperature, the wind power level, etc., and indicates, in the case of an illumination, the luminance. Thus, the event type depends upon the home appliance type. The event set value is the value set for the operation of commanding a home appliance for appliance control. For instance, the event set value indicates a value for turning on or off a home appliance, or a cooling temperature of, for example, 28° C. in the air conditioner. The event time point indicates the time point at which the home appliance control event is executed. The event time point is set between the start and end times of power saving.

Figure 10:
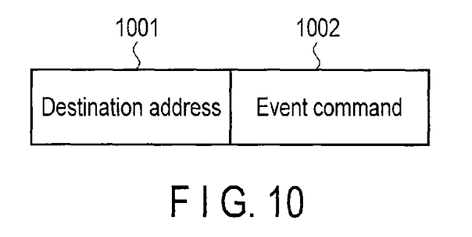
FIG. 10 is a view illustrating the content of an event command packet sent from the electric power management server of FIG. 1 to the home appliances of FIG. 1.

When the to-be-saved power compensation time is reached, the power management server 102, the rechargeable battery 103 and the home appliance group 104 perform to-be-saved power compensation in accordance with the home appliance control schedule table and the rechargeable battery charging schedule table stored in the home appliance control schedule table storage unit 332 and the rechargeable battery charging schedule table storage unit 333, respectively (step S405). At this time, the rechargeable battery starts to discharge.

Where home appliance control is needed, when the event time point of the home appliance control event in the home appliance control schedule is reached, the appliances-dedicated communication unit 303 of the power management server 102 transmits an event command packet to the home appliances 105 and 106. The event command packet contains a destination address 1001 and an event command 1002 as shown in FIG. 10.

The event command is a command for designating an event type and an event set value. The format of the event command packet may be a format defined by such a protocol as ECHONET (trademark), or be a unique format. Upon receiving the event command packet, the home appliances 105 and 106 execute control in accordance with the event command contained in the event command packet. The power management server 102 repeats processing until all events in the home appliance control schedule are completed.

Figure 11:
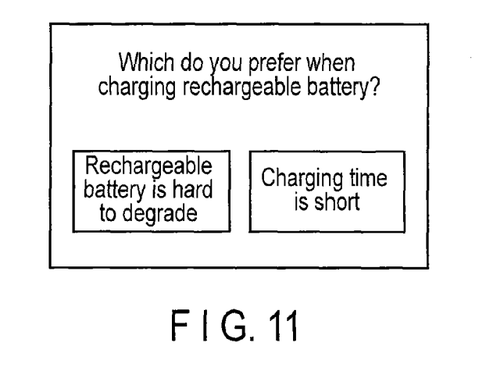
FIG. 11 is a view illustrating the content of an image presented to a user on a display unit.

In the above-described method, when the rechargeable battery charging schedule is determined, the shortest charging time is selected. Alternatively, the level of priority of selection may be preset by the manager of the power management server or the user. Yet alternatively, the user may determine the order of priority via a display unit provided with an input unit, as is shown in FIG. 11.

(Modification)

Figure 12:
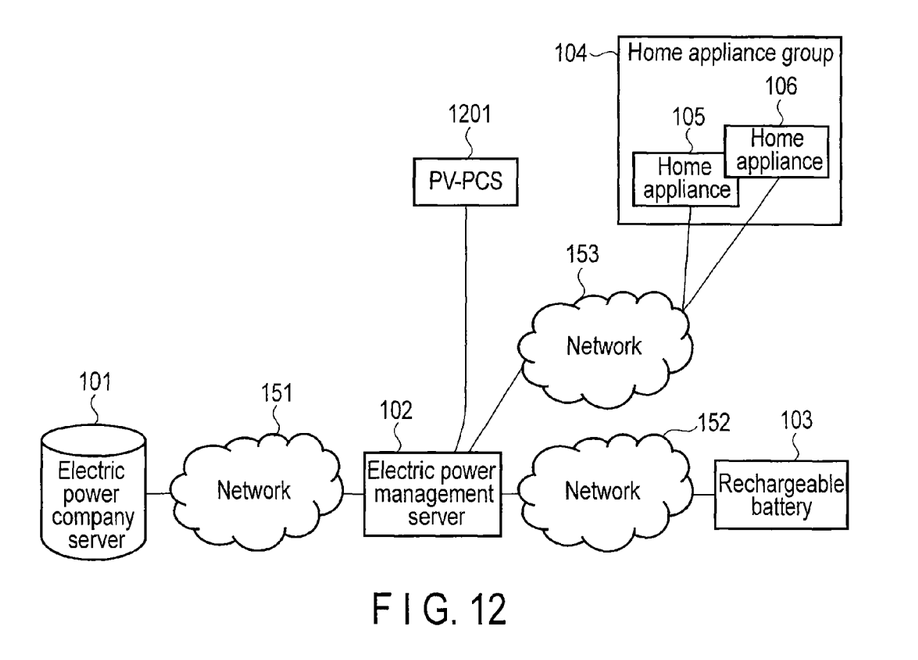
FIG. 12 is a block diagram illustrating a modification of the system of the embodiment.

The rechargeable battery may be charged with electric power purchased from an electric power company, or with electric power generated by a photovoltaic power conditioner (PV-PCS) 1201 as shown in FIG. 12.

If a home appliance has a memory and can store the event command, the power management server transmits an event command to the home appliance immediately after it generates a home appliance control schedule. At this time, the event command contains event time data, in addition to the event type data and the event set value. If the rechargeable battery has a memory and a clock, it stores the charging schedule, and starts to charge and discharge when the time indicated by the event time data is reached.

In the above-described power management apparatus, system and method according to the at least one embodiment, since a charge/discharge schedule for a rechargeable battery is generated immediately after a request for power saving to thereby start charging of the battery when necessary, the battery can be utilized to the maximum extent.

The flow charts of the embodiment and modification illustrate methods and systems according to the embodiment and modification of the embodiment. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric power management apparatus for controlling electric power of at least one home appliance using at least one rechargeable battery, the apparatus comprising:
   an analysis unit configured to analyze a charge residue of the at least one rechargeable battery;
   a first generating unit configured to generate a control schedule used to control the electric power of the home appliance in accordance with the charge residue;
   a second generating unit configured to generate a charge/discharge schedule used to control charge and discharge the at least one rechargeable battery in accordance with the charge residue;
   a first communication unit configured to receive and transmit a first packet from and to the at least one rechargeable battery;
   a second communication unit configured to receive a second packet for a request to save electric power from outside, wherein the electric power is saved in accordance with the second packet;
   a schedule unit configured to determine whether the request to save electric power is satisfied only by discharge of the at least one rechargeable battery, when the second communication unit receives the second packet; and
   a data storage unit configured to store information included in the first packet, the second packet, the control schedule, and the charge/discharge schedule,
   wherein the second generating unit generates the charge/discharge schedule upon receiving the second packet, and charging of the at least one rechargeable battery is commenced immediately upon receiving the charge/discharge schedule.

2. The apparatus according to claim 1, wherein the schedule unit estimates a charge residue of the at least one rechargeable battery assumed at an electric power saving start time, based on a current charge residue of the at least one rechargeable battery, a current time and the electric power saving start time, and determines whether the request is satisfied only by the discharge of the at least one rechargeable battery based on comparing the charge residue of the at least one rechargeable battery at the electric power saving start time with the requested saving electric power.

3. The apparatus according to claim 1, wherein when it is determined that the request is satisfied only by the discharge of the at least one rechargeable battery, the schedule unit determines whether the at least one rechargeable battery needs to be charged.

4. The apparatus according to claim 3, wherein when the schedule unit determines whether the at least one rechargeable battery needs to be charged, the schedule unit compares a current charge residue with the requested saving electric power.

5. An electric power management method for controlling electric power of at least one home appliance using at least one rechargeable battery, the method comprising:
   analyzing a charge residue of the at least one rechargeable battery;
   generating a control schedule used to control the electric power of the home appliance in accordance with the charge residue;
   generating a charge/discharge schedule used to control charge and discharge of the at least one rechargeable battery in accordance with the charge residue;
   receiving and transmitting a first packet from and to the at least one rechargeable battery;
   receiving a second packet for a request to save electric power from outside, wherein the electric power is saved in accordance with the second packet;
   determining whether the request to save electric power is satisfied only by discharge of the at least one rechargeable battery, when the second packet is received; and
   storing information included in the first packet, the second packet, the control schedule, and the charge/discharge schedule,
   wherein the generating the charge/discharge schedule generates the charge/discharge schedule upon receiving the second packet, and charging of the at least one rechargeable battery is commenced immediately upon receiving the charge/discharge schedule.

6. The method according to claim 5, further comprising: estimating a charge residue of the at least one rechargeable battery assumed at an electric power saving start time, based on a current charge residue of the at least one rechargeable battery, a current time and the electric power saving start time; and
   determining whether the request is satisfied only by the discharge of the at least one rechargeable battery based on comparing the charge residue of the at least one rechargeable battery at the electric power saving start time with the requested saving electric power.

7. The method according to claim 5, wherein when it is determined that the request is satisfied only by the discharge of the at least one rechargeable battery, whether the at least one rechargeable battery needs to be charged is determined.

8. The method according to claim 7, wherein when whether the at least one rechargeable battery needs to be charged is determined, a current charge residue is compared with the electric power requested to save by the request.

9. An electric power management system comprising:
   at least one home appliance;
   at least one rechargeable battery; and
   an electric power management unit,
   wherein the electric power management unit comprises:
   an analysis unit configured to analyze a charge residue of the at least one rechargeable battery;

a first generating unit configured to generate a control schedule used to control the electric power of the home appliance in accordance with the charge residue;

a second generating unit configured to generate a charge/discharge schedule used to control charge and discharge of the at least one rechargeable battery in accordance with the charge residue;

a first communication unit configured to receive and transmit a first packet from and to the at least one rechargeable battery;

a second communication unit configured to receive a second packet for a request to save electric power from outside, wherein the electric power is saved in accordance with the second packet;

a schedule unit configured to determine whether the request to save electric power is satisfied only by discharge of the at least one rechargeable battery, when the second communication unit receives the second packet; and a data storage unit configured to store information included in the first packet, the second packet, the control schedule, and the charge/discharge schedule, wherein the second generating unit generates the charge/discharge schedule upon receiving the second packet, and charging of the at least one rechargeable battery is commenced immediately upon receiving the charge/discharge schedule.

10. The apparatus according to claim 1, wherein the data storage unit includes a power saving demand storage unit, a storage unit for a home appliance control schedule table, and a storage unit for a rechargeable battery charging schedule table.

11. The system according to claim 9, wherein the data storage unit includes a power saving demand storage unit, a storage unit for a home appliance control schedule table, and a storage unit for a rechargeable battery charging schedule table.

* * * * *